US010353633B2

(12) United States Patent
Colenbrander (10) Patent No.: US 10,353,633 B2
(45) Date of Patent: Jul. 16, 2019

(54) MASS STORAGE VIRTUALIZATION FOR CLOUD COMPUTING

(71) Applicant: Sony Interactive Entertainment LLC, San Mateo, CA (US)

(72) Inventor: Roelof Roderick Colenbrander, Costa Mesa, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 191 days.

(21) Appl. No.: 14/135,213

(22) Filed: Dec. 19, 2013

(65) Prior Publication Data

US 2015/0178018 A1 Jun. 25, 2015

(51) Int. Cl.
| | |
|---|---|
| G06F 3/06 | (2006.01) |
| A63F 13/95 | (2014.01) |
| G06F 13/28 | (2006.01) |
| A63F 13/352 | (2014.01) |
| A63F 13/355 | (2014.01) |

(52) U.S. Cl.
CPC .......... *G06F 3/0664* (2013.01); *A63F 13/352* (2014.09); *A63F 13/355* (2014.09); *A63F 13/95* (2014.09); *G06F 3/0605* (2013.01); *G06F 3/067* (2013.01); *G06F 13/28* (2013.01)

(58) Field of Classification Search
CPC ...... G06F 3/0664; G06F 3/0604; G06F 13/28; G06F 3/067; G06F 3/0655; A63F 13/95; A63F 13/355; A63F 13/352
See application file for complete search history.

(56) References Cited

U.S. PATENT DOCUMENTS

| | | | |
|---|---|---|---|
| 5,034,817 A | 7/1991 | Everett | |
| 5,502,462 A | 3/1996 | Mical et al. | |
| 5,969,828 A | 10/1999 | Kawasaki et al. | |
| 7,287,099 B1 * | 10/2007 | Powderly | G06F 13/385 345/537 |
| 8,281,288 B1 | 10/2012 | Spencer | |

(Continued)

FOREIGN PATENT DOCUMENTS

| | | |
|---|---|---|
| WO | 2009079560 A1 | 6/2009 |
| WO | 2011085024 A1 | 7/2011 |

OTHER PUBLICATIONS

International Search Report and Written Opinion for International Application No. PCT/US2014/061633, dated Mar. 26, 2015.

(Continued)

*Primary Examiner* — Rocio Del Mar Perez-Velez
(74) *Attorney, Agent, or Firm* — JDI Patent; Joshua Isenberg; Robert Pullman (57) ABSTRACT

Aspects of the present disclosure relate to systems and methods for virtualizing mass storage using an interface card, or other special hardware unit, operatively coupled to a host system. In various implementations, the interface device and host system may collectively emulate a mass storage device for another "terminal" computing system in a manner that is transparent to the terminal system. Moreover, in various implementations, a mass storage device may be emulated in a manner that is transparent to the terminal system, without requiring modifications to the terminal platform's hardware or software architecture.

12 Claims, 5 Drawing Sheets

(56) References Cited

U.S. PATENT DOCUMENTS

| | | | |
|---|---|---|---|
| 2003/0110351 A1* | 6/2003 | Blood | G06F 3/0607 |
| | | | 711/111 |
| 2004/0174378 A1 | 9/2004 | Deering | |
| 2006/0061517 A1 | 3/2006 | Jolly et al. | |
| 2008/0143729 A1 | 6/2008 | Wyatt et al. | |
| 2009/0135916 A1 | 5/2009 | Lee | |
| 2010/0149413 A1 | 6/2010 | Kumakawa | |
| 2010/0280817 A1 | 11/2010 | Unseld | |
| 2011/0087814 A1* | 4/2011 | Liu | G06F 13/24 |
| | | | 710/260 |
| 2011/0263332 A1 | 10/2011 | Mizrachi | |
| 2011/0271067 A1 | 11/2011 | Chou et al. | |
| 2012/0184373 A1 | 7/2012 | Kim et al. | |
| 2012/0306326 A1 | 12/2012 | Schossmann et al. | |
| 2012/0306926 A1 | 12/2012 | Millet et al. | |
| 2013/0265389 A1 | 10/2013 | Hrebien | |
| 2014/0085275 A1 | 3/2014 | Tripathi | |
| 2014/0195634 A1* | 7/2014 | Kishore | H04L 67/1097 |
| | | | 709/213 |
| 2014/0281023 A1 | 9/2014 | Apte | |
| 2015/0181084 A1 | 6/2015 | Colenbrander | |

OTHER PUBLICATIONS

International Search Report and Written Opinion for International Application No. PCT/US2014/061636, dated Mar. 5, 2015.

Taiwanese Office Action for TW Application No. 103136465, dated Aug. 31, 2015.

Non-Final Office Action for U.S. Appl. No. 14/135,374, dated Mar. 21, 2016.

International Preliminary Report on Patentability for International Application No. PCT/US2014/061633, dated Jun. 30, 2016.

Notice of Allowance for U.S. Appl. No. 14/135,374, dated Jul. 13, 2016.

Taiwan IPO Search Report for TW Application No. 103136466, dated May 12, 2016.

Office Action dated Aug. 2, 2018 for Chinese Patent Application No. 201410771149.X.

* cited by examiner

MASS STORAGE VIRTUALIZATION FOR CLOUD COMPUTING

CROSS REFERENCE TO RELATED APPLICATIONS

This application is related to commonly-assigned, co-pending U.S. application Ser. No. 14/135,374, to Roelof Roderick Colenbrander, entitled "VIDEO LATENCY REDUCTION", filed the same day as the present application, the entire contents of which are herein incorporated by reference.

FIELD

Aspects present disclosure relates to storage virtualization. Further aspects of the present disclosure relate to storage virtualization for cloud computing applications designed for embedded platforms.

BACKGROUND

With bandwidths and data transfer rates of telecommunication systems continuing to advance, many of today's computing needs are shifting towards network-based distributed computing systems, commonly referred to as "cloud computing." Generally speaking, cloud computing involves offloading certain computing tasks to one or more remote computing resources and utilizing the remote computing resources to provide services to a local device. Cloud computing is often implemented as a client-server model, with the remote server providing desired computing capabilities to a local client device, avoiding the need for the local client device to perform certain computing tasks on its own. In many instances, the computing resources can be entirely or almost entirely offloaded to the server, with the client providing little or no more than a user interface for the cloud computing task, allowing potentially any internet connected device to serve as a client for a particular application.

Cloud computing has been adopted in a wide variety of computing services, including remote data storage solutions, music and video streaming services, and a wide variety of other consumer and business solutions. In general, cloud computing provides several well-known benefits, including increased efficiencies through the use of shared resources, increased flexibility in accessing content without restriction to a particular device, lower up-front costs when hardware upgrades become available, and other advantages.

One arena in which cloud computing has yet to achieve widespread adoption is in the ever popular field of video gaming. Video games, including personal computer (PC) games, home console games, handheld console games, and the like, remain a popular source of entertainment among consumers. With a large and ever growing collection of available video game titles, cloud gaming provides a particularly attractive solution to many video game demands. Ideally, within a cloud gaming framework a user would be able to instantly access any video game title from among a vast collection of remotely stored titles, without needing a physical copy of the game, without having to wait for the title to download, and without locally possessing the hardware system or resources needed to run the game. Unfortunately, implementing this type of service within a traditional cloud computing server design presents several technical challenges that have thus far prevented widespread adoption of cloud gaming for many video game platforms.

One challenge is that many of today's video games are very fast paced and action packed, with advanced graphics that require a significant amount of computing resources to render. Particularly in a video streaming based server design, in which all of the game computations and graphics rendering computations are performed remotely, the game needs be able to perform all these tasks and deliver a compressed audio/video stream to the client device with minimal to no perceptible latency in response to control inputs. Otherwise, this may disrupt the timing for the player and fail to replicate the responsiveness of a traditional locally executed gaming session.

Another challenge stems from the fact that there has traditionally been a distinction between PC games on the one hand, which are designed to run on personal computers, laptops, and other computing systems of a general purpose nature, and console games on the other hand, which are designed to run on specialized systems known as video game consoles. Video game consoles are typically designed as embedded platforms having unique computing architectures specially adapted for the video gaming environment. Using dedicated console hardware as a video gaming platform provides several benefits, particularly in the form of optimizing the hardware for the high computing resource demands of graphics rendering and gaming computations required to produce many of today's video games. As a result, while PC games have achieved some popularity, console games have traditionally dominated the video game market and may continue to do so in the future.

However, adapting video game consoles and other embedded platforms to a cloud streaming service presents several challenges. Extensive modifications of the hardware or software architecture of the specialized platform may present compatibility issues with applications designed for the specialized platform. As a result, traditional storage server and storage virtualization techniques are not a viable solution for cloud based streaming of applications designed for many of these platforms.

It is within this context that the present disclosure arises.

SUMMARY

An implementation of the present disclosure may include an interface device having a first communication interface, a second communication interface, and a specialized processing unit operatively coupled to said communication interfaces. The first communication interface is a mass storage interface. The second communication interface is an expansion interface. The specialized processing unit includes a mass storage device controller connected to the first communication interface and a direct memory access (DMA) engine connected to the second communication interface. The mass storage device controller is configured to receive a mass storage data request through the first communication interface. The DMA engine is configured to notify a host system of the mass storage data request through the second communication interface.

Another implementation of the present disclosure may include a system having a central processing unit; a first memory unit operatively coupled to the central processing unit; a storage process embodied in the first memory unit and executable by the central processing unit (CPU); a first communication interface; and a specialized processing unit operatively coupled to the first communication interface. The first communication interface is a mass storage interface. The specialized processing unit has a mass storage device controller connected to the first communication interface and a memory access interface operatively coupled to the CPU. The mass storage device controller is configured to receive a mass storage data request from through the first communication interface. The memory access interface is configured to notify the storage process of the mass storage data request. The storage process is configured to process the data request by accessing a storage system.

Another implementation may include a method comprising: a) receiving, from a first computing device, a mass storage data request at a mass storage device controller; b) notifying, with a memory access interface connected to the mass storage device controller, a storage process embodied in a second computing device of the data request; c) accessing, with the storage process of the second computing device, a storage system having data corresponding to the data request; d) storing, with the storage process of the second computing device, the data corresponding to the data request on a first memory unit; e) programming, with the storage process of the second computing device, the mass storage device controller to access the data from the first memory unit in order to complete the data request.

BRIEF DESCRIPTION OF THE DRAWINGS

The teachings of the present disclosure can be readily understood by considering the following detailed description in conjunction with the accompanying drawings, in which:

FIG. 4A-4B is a schematic diagram of an example computer architecture for a host system coupled to a terminal system. FIG. 4A is a schematic diagram of an example terminal system architecture.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Aspects of the present disclosure relate to systems and methods for virtualizing mass storage using an interface card, or other special hardware unit, operatively coupled to a host system. In various implementations, the interface device and host system may collectively emulate a mass storage device for another "terminal" computing system in a manner that is transparent to the terminal system. Moreover, in various implementations, a mass storage device may be emulated in a manner that is transparent to the terminal system, without requiring modifications to the terminal platform's hardware or software architecture.

Those skilled in the art may be familiar with 'virtual machine' software, such as VMWare, VirtualBox or Parallels, which allow, e.g., a 'virtual' session of an older operating system (e.g., Windows XP) to run within a session of a newer operating system (e.g., Windows 7). Virtual machine software is often used to simulate physical hardware components, such as disk drives, network cards, video cards in software for compatibility reasons. According to aspects of the present disclosure specialized hardware and software can virtualize a mass storage device in situations where it is impractical to do so with software alone.

Implementation Details

Figure 1:
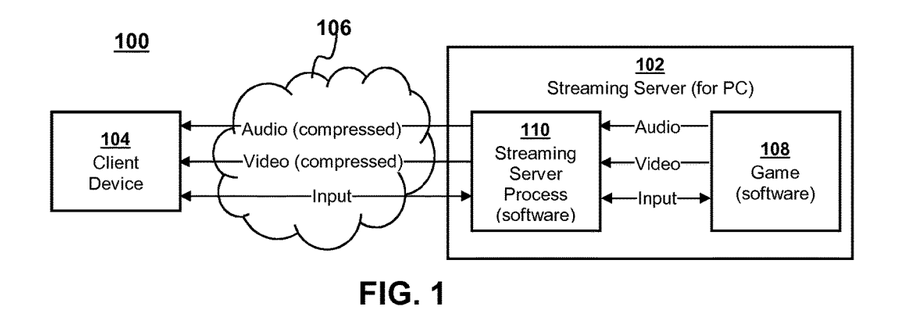
FIG. 1 is a schematic diagram of an example streaming technique over a network.

To better illustrate various aspects of the present disclosure, a first illustrative example of a distributed computing system 100 is depicted in FIG. 1. The distributed system 100 depicted in FIG. 1 involves a plurality of computing devices 102,104 connected over a network 106, such as the internet.

In the example distributed system, a streaming server 102 executes a program 108 in order to provide a real-time stream of the program output to the remotely connected client device 104 through the network 106. In the illustrated schematic diagram of FIG. 1, the program 104 may be a video game program which processes control inputs received from the client device 104 and sends a compressed audio and video stream to the client device 104 in accordance with the execution of the program 108. A user located at the client side may interact with the program through a user interface of the client device 104, e.g. by providing control inputs and receiving the audio and video game output at a display and/or speakers connected to the client device 104. In the example of FIG. 1, the computational load for processing the inputs, rendering the video game graphics, and the like, may be entirely offloaded to the streaming server 102 for remote execution.

In order to implement the cloud gaming using the system 100 depicted in FIG. 1, the streaming server 102 may be configured to not only execute the game program 108, but the streaming server 102 may also implement a "streaming server process" 110 embodied in the server 102, which may perform various functions to coordinate the program inputs/outputs for communication between the client device 104 and the streaming server 102 over the network 106. By way of example, the streaming server process 110 may be embodied in one or more applications which are run on the streaming server 102 in coordination with the game software 108. Remote execution of the game 108 together with the streaming server process 110 may be performed with minimal or no latency between the inputs and outputs at the client device 104 so that the user at the client side perceives that the program 108 is being executed locally. Moreover, a wide collection of remotely stored programs may be accessible for execution. For example, in a cloud gaming application, the user would like to be able to select any game designed for the relevant video game platform, and the remote server would be able to load the game, execute it, and streams its output to the client device in accordance with inputs received from the user and with no perceptible latency between the received inputs and audio/video outputs.

In the example depicted in FIG. 1, this may be accomplished by executing both the streaming server process 110 and the game code 108 at the same computing device, e.g., the streaming server 102. The streaming server may access a selected program from potentially any storage device, such as a locally connected mass storage device, a storage server, a network, and the like, through a suitable connection. For cloud gaming, and other cloud computing implementations, this may be readily implemented if the software application 108 that is executed at the server 102 for the client 104 is designed to run personal computer (PC) architecture or other computer architecture that is similar to the streamliner server 102. By way of example, and not by way of limitation, for a PC cloud gaming implementation, a readily available x86 based server may be used to not only implement the streaming server process 110, but also execute the PC game program 108 once it is accessed by the server 102.

However, the example technique 100 depicted in FIG. 1 may not be suitable for certain applications in which the program 108 is designed to be executed on embedded platforms and other specialized architectures. For example, if the desired program is a video game designed for a dedicated console platform, the game software may not be able to run on the server architecture without some type of emulator. Unfortunately, in a cloud computing environment in which minimizing latency is a chief concern, a software emulator executed on a streaming server may be an undesirable solution, particularly in graphics intensive applications where interpretation of the code by the emulator at run-time would introduce a perceptible delay. Moreover, in many cases it would be impractical to build a dedicated server for each unique architecture for which a cloud service is desired. In other situations, an emulator could be a desirable solution, but a suitable emulator might not be available.

Figure 2:
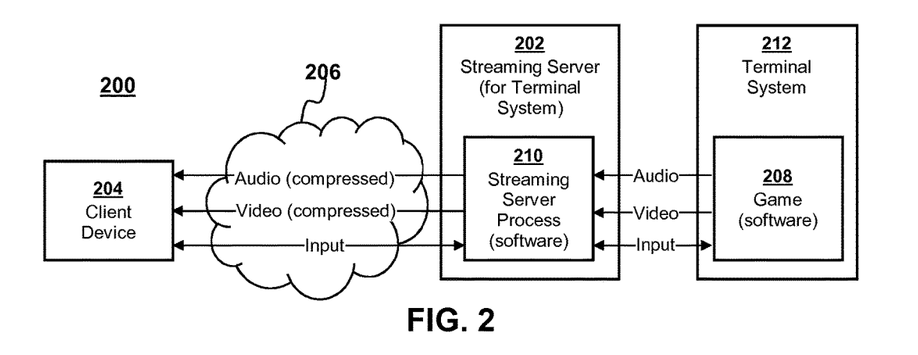
FIG. 2 is a schematic diagram of another example streaming technique over a network.

In order to address these challenges, it may be desirable to utilize an additional computing device at the server side for execution of the program, whereby the additional computing device executes the desired program while the streaming server coupled thereto performs its usual functions for interfacing with a client device. An illustrative example of a distributed system 200 which utilizes such a technique is depicted in FIG. 2, in which a "terminal system" 212 is connected to a streaming server 202, and the terminal system executes a desired application 208. The streaming server can provide resources for network storage and video compression if the terminal system does not otherwise have sufficient free resources for these functions.

In certain implementations, the terminal system 212 may be an embedded system or other computing system having a specialized architecture, such as a video game console, while the streaming server 202 may be based on any computing architecture, such as an x86 instruction set architecture, which is adapted to provide streaming services and does not necessarily have to have a similar architecture as the terminal system 212. The streaming server 202 may be configured to execute a streaming server process 202 and provide the usual cloud services for the terminal system program 208, and the computing devices at the server side, e.g. the streaming server 202 and the terminal system 212, may collectively operate to provide video game streaming services for a client device 204.

The configuration in the simplified schematic depicted in FIG. 2 may provide a practical and flexible server solution that can be readily adapted to a variety of different software platforms designed for a variety of different computing architectures. For example, potentially any streaming server 202 could be adapted to stream software applications designed for a variety of different computing architectures by locally connecting a terminal system which runs the software.

However, executing the desired software on a terminal system 212 at the server side may present certain challenges within a cloud computing framework. For example, the terminal system 212 may be able to execute any selected program for a current streaming session from among a variety of different programs, similar to the process described above with respect to the example setup depicted in FIG. 1. Likewise, any other data reads/writes to a storage device required by the program 208 running on the terminal system 212 could be freed from constraints of local storage by the terminal system. Storage data requests are typically accomplished through a local mass storage connection in the terminal system 212, such as a serial Advanced Technology Attachment (SATA) connection or other mass storage interface. It would be desirable to provide a virtualized storage solution for the terminal system without having to make modifications to its hardware architecture or consuming additional computing resources with the storage virtualization process.

To better appreciate the challenge in the context of a cloud gaming environment, the following example illustrates how the server set up in FIG. 2 might be utilized in a particular cloud gaming implementation. Specifically, a user at the client device 204 may be assigned to a "cloud terminal system" 212 for a gaming session. At the time the user starts playing, the game 208 the user wants to play should be available on the cloud terminal system 212. Similarly, once the gaming session is over and the user is done, the terminal system 212 should be restored to a clean state for a next session by a different user, which may involve a different game.

Unfortunately, virtualizing game storage in this manner using storage virtualization software within the terminal system 212 would consume valuable computational resources (e.g. CPU and memory) and may produce compatibility issues with the game. Moreover, in an application involving a heavy computational load, such as many modern video games, which incorporate advanced graphics and other resources intensive tasks, consuming additional resources from the terminal system for storage virtualization may not be a viable solution.

Figure 3:
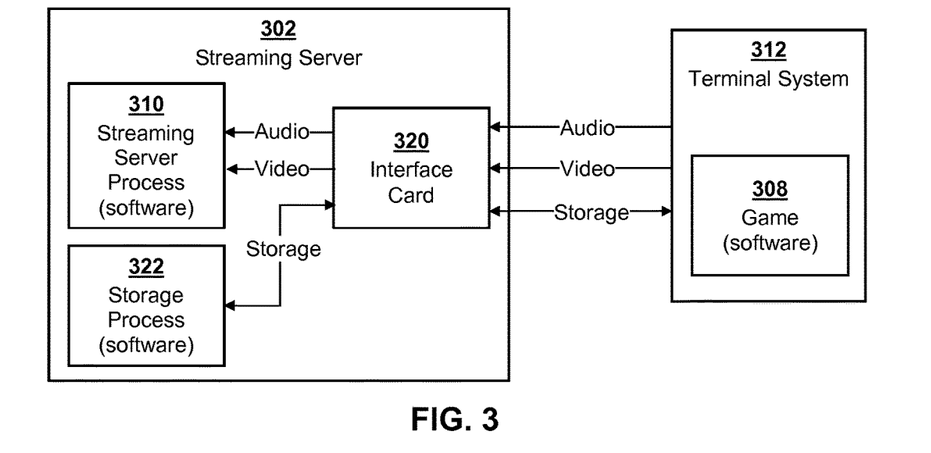
FIG. 3 is a schematic diagram of an example host system having an interface card to provide storage virtualization for a terminal system.

An illustrative example of a storage virtualization technique according to various implementations of the present disclosure is depicted in FIG. 3. In the example virtualization technique of FIG. 3, a mass storage device is emulated using a "host system" having a specialized piece of hardware, so that a mass storage device may be emulated for a terminal system connected thereto. The example technique of FIG. 3 may be implemented in a cloud streaming application similar to that depicted in FIG. 2, in which the terminal system may be a specialized system running the desired application, and the host system for the mass storage device emulation is a streaming server. However, it is understood that storage virtualization in accordance with principles herein may be implemented in other contexts, including cloud computing applications beyond game streaming, and local implementations where storage virtualization for a computing device is desired, particularly where it is desired without making modifications to the computing device.

Turning to the example of FIG. 3 in more detail, virtualized storage is provided for the terminal system 312 using a specialized interface device 320 coupled to a host system 302 for the interface device, which is in this case the streaming server. The interface device 320 together with a storage process 322 embodied in the host system 302 may perform various mass storage device data requests received from the terminal system 312.

In the example depicted in FIG. 3, the interface device 320 may be a piece of hardware which looks like an actual mass storage device to the terminal system, but under the hood its data may come from a storage server (not pictured). A normal mass storage device typically uses a SATA connection or other standard mass storage interface. In order emulate the mass storage device and receive the data requests, the interface device 320 of FIG. 3 may include a similar SATA connection or other mass storage communication interface compatible with the mass storage communication interface of terminal system, along with additional components such as a specialized processing unit, a memory, and other components.

In various implementations, in order to facilitate easy integration of the storage virtualization functionality into computing system, such as a streaming server or other "host" system, the interface device 320 may be implemented as an expansion card, such as a PCI-Express add-on card, which may be connected to the host system 302 through an expansion interface of the host system. During operation, the interface card may receive disk read and/or write requests from the terminal system through its mass storage connection (e.g. through a SATA port). These data access requests may be ultimately processed by a storage application 322 on the host system 302, and the storage application may access data from a file, storage server, or something else.

Although not necessary for the storage virtualization functionality, the interface device 320 may also optionally include additional components to provide other functionality that may be especially useful in a cloud streaming context. For example, in order to support streaming functionality in the host system, the interface device 320 may optionally include one or more additional interfaces for audio and/or video data transfer, as well as corresponding functionality to support audio/video (A/V) streaming via a streaming process of the host system 302 in order to support cloud gaming or other cloud computing implementations. The optional A/V interface of the interface device 320 may be compatible with the terminal system 312 and may configured according to any of a variety of A/V standards, such as HDMI, composite video, component video, S-video, or another A/V communication interface.

Figure 4A:
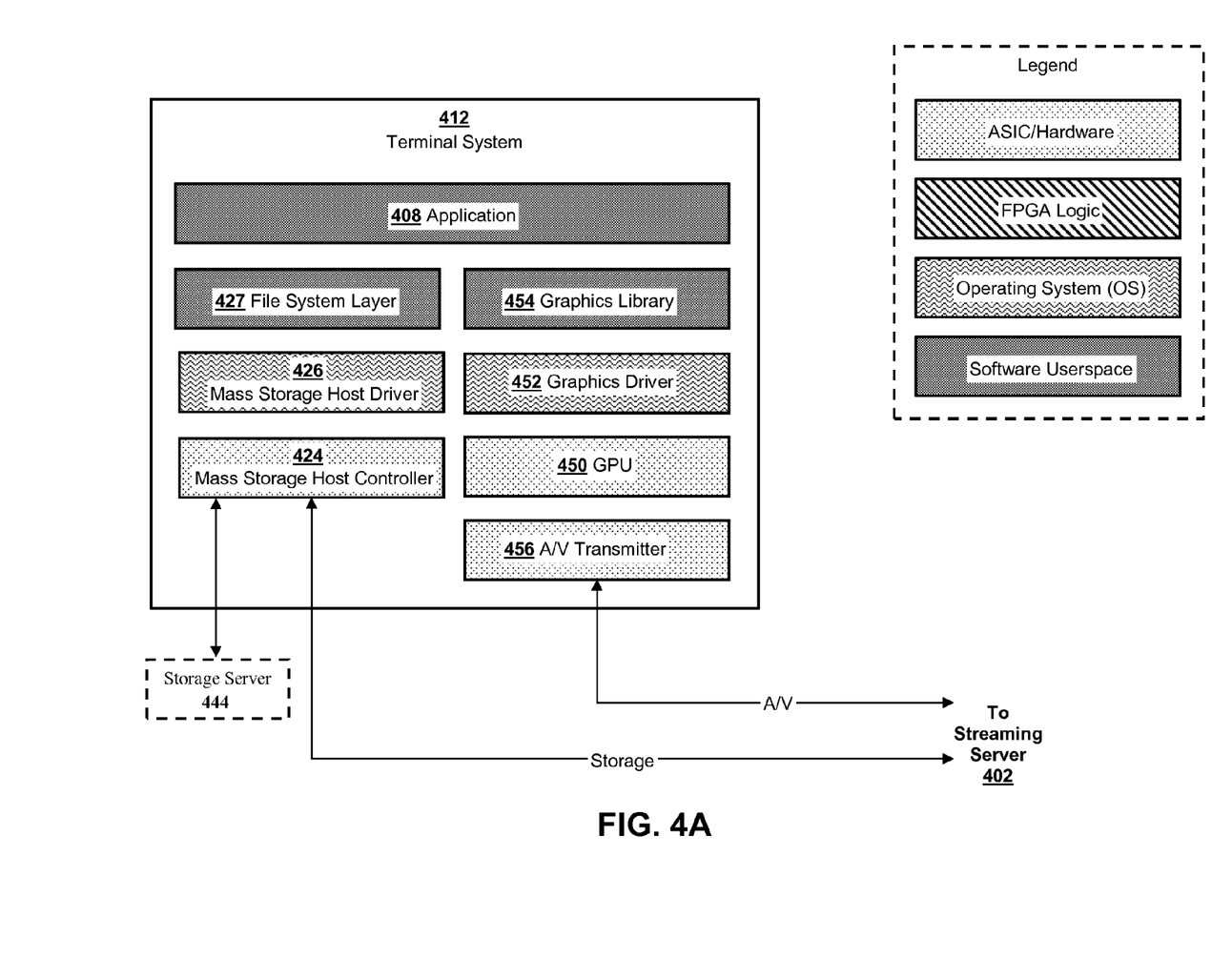
Figure 4B:
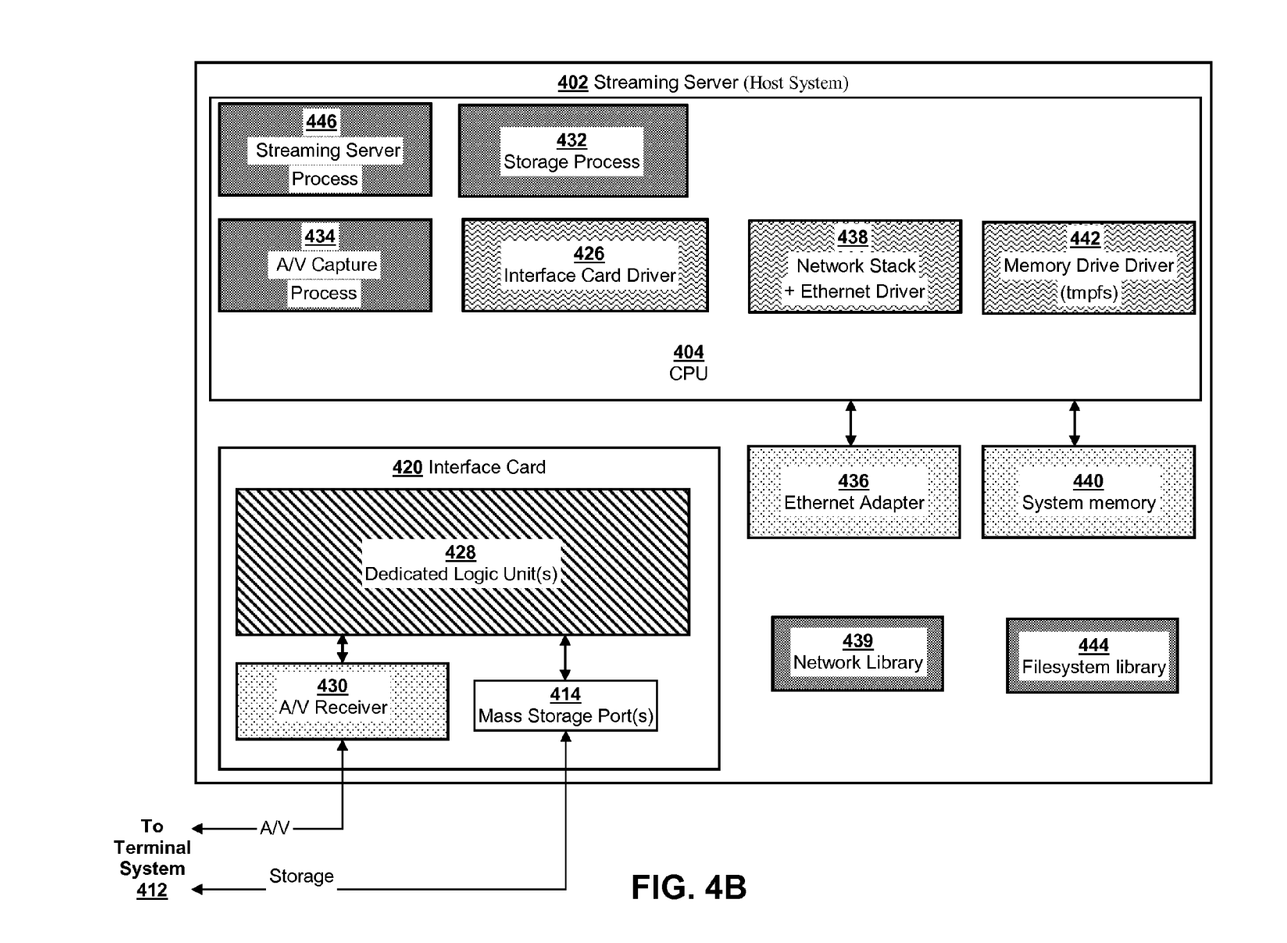
FIG. 4B is an example host system and interface card architecture.

FIGS. 4A and 4B provide a more detailed overview of an illustrative hardware/software architecture of an interface device and certain computing devices according to various implementations of the present disclosure. FIG. 4A illustrates a computing architecture for an example terminal system according to various aspects of the present disclosure. FIG. 4B illustrates a computing architecture for an example host system having an example interface device according to various implementations of the present disclosure. In some implementations, the terminal system may be an existing embedded system, video game console, or other computing device having a specialized architecture. In some implementations, the host system may be a streaming server configured to stream an application running on the terminal system to a client device, e.g. as depicted in FIG. 2.

The example terminal system 412 may include a mass storage host controller 424 (also sometimes known as a host adapter or host bus adapter), which may be, e.g., a SATA host controller (AHCI), USB host controller, or a host controller for another mass storage communication interface standard. The terminal system 412 may also include a corresponding mass storage device driver 426 that is compatible with the mass storage device host controller 424 to facilitate communication via the storage device interface. In order to connect to a mass storage device, normally the host controller 424 would be connected to the mass storage device using a corresponding connector (such as a SATA cable, USB cable, or other connector depending on the mass storage device interface of the terminal system). Specifically, the host controller 424 would be connected to a mass storage device controller (also sometimes known as a "disk controller", although the mass storage device may be a solid state drive or other storage device that does not necessarily use a disk) of the particular mass storage device to which it is connected. In the example system depicted in FIGS. 4A-4B, the host controller 424 is instead connected to the interface device 420, which together with its host system 402 emulates a mass storage device for the terminal system 412.

The interface device 420 may include a communication interface for mass storage device connections that is compatible with the storage communication interface used by the terminal system 412. The communication interface of the interface device may include one or more mass storage ports 414, such as one or more SATA ports, USB ports, or other compatible mass storage interface hardware. The interface device 402 may include a specialized processing unit operatively coupled to the mass storage hardware interface, with the specialized processing unit having logic 428 that is dedicated to performing functions associated with mass storage device emulation, and optionally other functions, for signals received through the storage connector from the terminal system 402. The logic 428 may also support communication with the host system 402 through an additional communication interface, which may communicate with a peripheral bus of the host system 402 in order to interface with a storage process embodied in the host system. By way of example, and not by way of limitation, the interface device 420 may be an add-on card which communicates with the host system 402 process bus through an expansion interface, such as peripheral component interconnect (PCI),), PCI-eXtended (PCI-X), PCI-Express (PCIe), or another interface which facilitates communication with the host system 402 e.g., via a peripheral bus. The host system may include an interface device driver 426 to support the exchange of signals via the interface device 420.

In certain implementations, the specialized processing unit may be a field programmable gate array (FPGA), an application specific integrated circuit (ASIC), or another specialized processing unit having dedicated units of logic configured in accordance with principles described herein. The logic units 428 of the specialized processing unit may also include dedicated logic to support various functions for cloud streaming in addition to storage virtualization, such as audio/video capture of the output from an application 408 running on the terminal system 402, which may facilitate streaming of the A/V output over the network by the host system 402 in implementations involving cloud gaming. The interface card 402 may include an A/V communication interface, such as one or more HDMI ports or other A/V ports, as well as a compatible A/V receiver 430 to receive the A/V output of the application running on the terminal system through a corresponding A/V connector.

In the example depicted in FIGS. 4A-4B, a mass storage device controller embodied in the logic 428 of the specialized processing unit is controlled by the interface device driver 426 in the host system 402, and a storage process 432 embodied in the host system 402, e.g. a software application running on a central processing unit 404, may provide data transport services for the interface device driver 426. For example if the terminal system 412 requests to read data from its disk drive or other mass storage device connected to via the mass storage connector, this request may make it through the mass storage host controller 424, the mass storage device controller contained in the logic 428, the interface device driver 426, to the storage process 432 embodied in the host system. The storage process 432 may then retrieve the data, which it could get from a variety of sources. For example, the storage process 432 may retrieve the data from a disk drive or other mass storage device locally connected to the host machine, or it may retrieve it from a memory drive or a storage server over a network. Whichever method the storage process uses is transparent to the terminal system 402.

In certain implementations, the host system 402 may optionally be a streaming server adapted to transmit over a network a stream of output from the application 408 running on the terminal system 412. For example, the host system 402 may include an A/V process 434, which may be an application running on the host system 402. The A/V capture process may coordinate with dedicated logic 428 in the specialized processing unit for capturing an A/V stream sent through an A/V connector connected to the interface card 420. The streaming server 402 may include an Ethernet adapter or other network adapter 436, and a corresponding Ethernet driver or other network driver 438 for the operating system of the host 402, with a compatible network library 439 providing protocol support for the network communication. The host system may also include system memory 440, controlled by a corresponding memory driver 442 (e.g. tmpfs) and supported by a file system library 444. A streaming server process 446 may be run on the host system 402 to perform functions associated with provide a real time stream to a client device connected over a network (not pictured in FIGS. 4A-4B).

In some situations, data storage may be implemented using a combination of a remote storage server 448 (shown in phantom in FIG. 4A), the memory 440 and the memory driver 442. By way of example, and not by way of limitation, in some implementations data may only be read from the storage server 448 and written to the memory 440 by the memory driver 442.

The terminal system 412 may include various other components to support the application 408, which may be, e.g., video game software designed for an existing embedded platform. The terminal system 412 may include a file system layer 427 to access storage, as well various components to support graphics rendering for the application 408. In addition to a central processing unit (CPU), the terminal system 412 may include a graphics processing unit (GPU) 450, which may be operated by a graphics driver 452 and supported by a graphics library 454. An A/V transmitter 456, such HDMI transmitter, may be included to transmit the application audio and/or video output to the host interface device in the host system through a compatible A/V connector.

Figure 5:
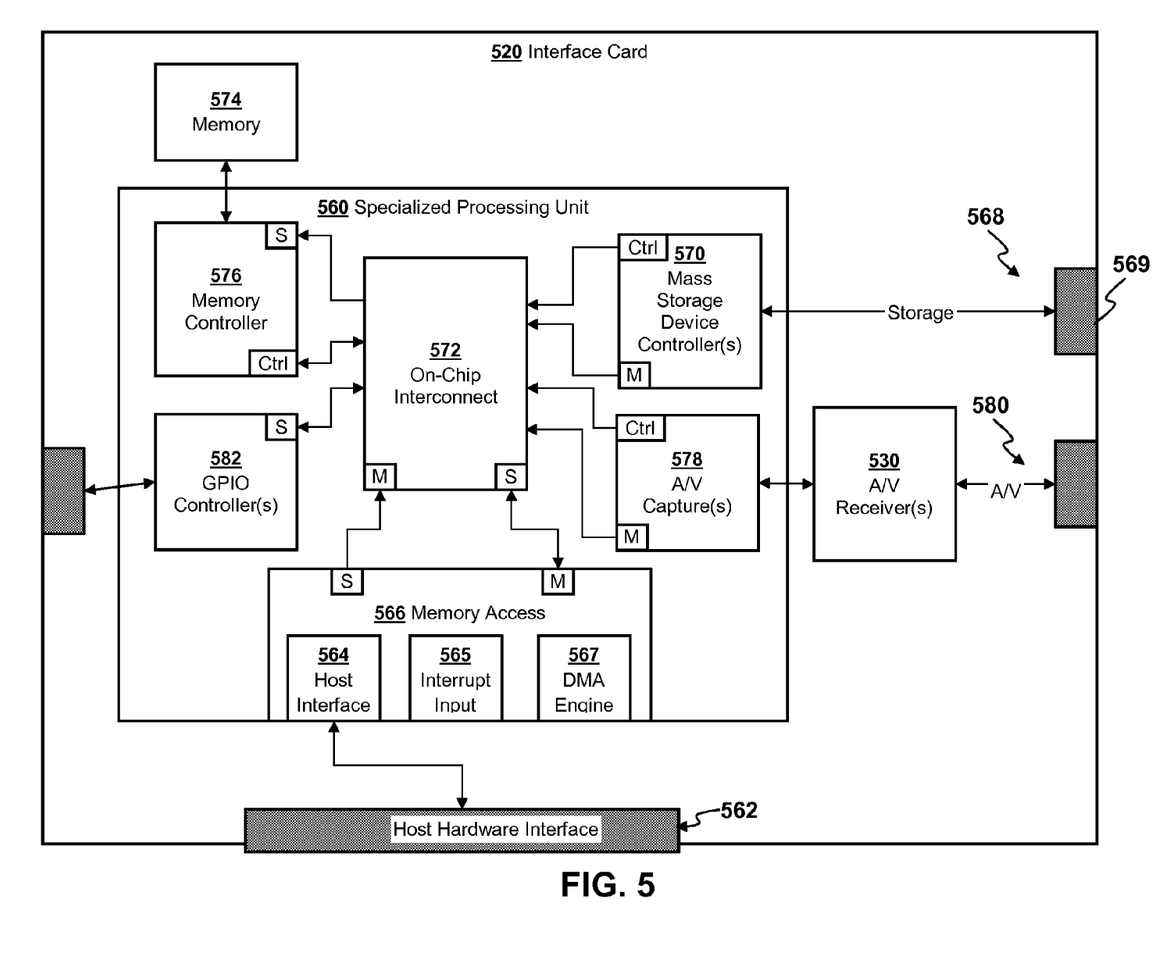
FIG. 5 is a schematic diagram of an example interface card design having a specialized processing unit.

Turning now to FIG. 5, a schematic diagram of an example interface device 520 that may be implemented on the interface card 420, some components on it, and internals of an example specialized processing unit 560 is depicted in accordance with various implementations of the present disclosure. By way of example, and not by way of limitation, the interface device 520 may be configured as an add-on card having components attached to a printed circuit board (PCB), and the interface card 520 may interface with a peripheral bus of a host system through a host hardware interface 562, such as a peripheral expansion port or other expansion communication interface which allows communication the peripheral bus of a host system when connected.

The example specialized processing unit 560 may include various blocks of logic dedicated to specialized functionality in accordance with various aspects of the present disclosure. The specialized processing unit may be implemented, e.g., as an FPGA, ASIC, or similar specialized processing unit. The specialized processing unit 560 may include a host interface block 564 which implements part of a protocol stack for the communication interface between the interface card 520 and a peripheral bus of a host system (not pictured in FIG. 5) for the interface device 560.

Communication busses like PCI-Express can be thought of as a protocol stack having several layers. Different communication protocols have different layers. Typically there is an 'application layer' at the top, then some transport related layers in the middle and some physical layer at the bottom. The host interface block 564 need not implement all layers of such a protocol stack. Instead, the host interface block may take care of the physical layer, which is responsible for putting digital information on a communication link, e.g., through electrical or optical signals. The host interface block may also be responsible for portions or possibly all of the 'transport layers' of the protocol stack, but need not be responsible for the application layer.

By way of example, and not by way of limitation, the host interface block 564 may be a hard PCIe block for communication through a PCI-Express connection, and which embeds the protocol stack for a PCIe interface or other interface for accessing a local bus of the host system. The host interface block 564 may be integrated into a memory access interface unit 566 which, together with other logic units of the specialized processing unit 560, may directly access system memory of a host system through the host hardware interface 562, e.g., using an interrupt of the request to the host system.

In some implementations, the memory access interface 566 may include components that provide memory access and interrupt functionality. In particular, the host interface block 564 may be configured to provide an connection between an on-chip-interconnect 572 and the host hardware interface 562 in a way that makes any on-chip device accessible from the host system using memory mapped Input/Output (I/O). This functionality would allow the host system to program any device connected to the on-chip-interconnect 572, such as the mass storage controller 570, memory controller 576, or GPIO 582.

The memory access interface 566 may also include an interrupt connection 565 that allows any connected device, e.g., the mass storage controller 570, to generate an interrupt upon an event (e.g., a mass storage read request) arrival). It is desirable for the memory access interface to provide this functionality if there can be only one device interfacing with the host hardware interface hardware 562.

The memory access interface 566 may also (optionally) include a direct memory access (DMA) engine 567. As used herein, and as is generally understood by those skilled in the art, the term direct memory access (DMA) refers to a feature that allows certain hardware subsystems within a computer to access system memory independently of the computer's central processing unit (CPU). The DMA engine 567 may implement data move operations between the host interface block 564 and the host hardware interface 562. In some implementations, the memory access interface unit 566 may implement portions of a protocol stack (e.g., PCI Express) not provided by the host interface block 564, such as connecting the host interface block 564 to the on-chip-interconnect 572.

For purposes of functionality for mass storage device virtualization, the interface device 520 may include one or more mass storage device communication interfaces 568, which may be implemented in the form of one or more SATA ports 569 and/or connectors, or other mass storage device communication interfaces, and which may be attached to a circuit board of the interface device 520. By way of example, and not by way of limitation, the interface card 520 may contain two SATA ports to facilitate connection to two terminal systems, although it is noted that the interface device may alternatively contain a different number of mass storage device connectors so that a single interface device 520 may service a different number of terminal systems. For each of the mass storage device connectors 568, there may be a corresponding mass storage device controller 570 embodied in the specialized processing unit 560 that is compatible with the particular mass storage communication interface (e.g. SATA).

The one or more mass storage device controllers 570 may be connected to other logic units of the specialized processing unit 560 through the on-chip interconnect 572, which may provide each of the mass storage device controllers 572 access to host system interface components (e.g. PCI-Express). The on-chip interconnect may be configured to a standard on-chip bus architecture configured to connect functional blocks on a specialized processing unit (e.g. an FPGA or ASIC). For example, if the specialized processing unit 560 is an FPGA, the components of the specialized processing unit may be interconnected using master-slave architecture, e.g., an Advanced Microcontroller Bus Architecture (AMBA), such as AXI4 or AXI4-Lite, or another suitable on-chip bus architecture. AXI4 may be used for large data transport and AXI-Lite may be used for low performance connections or for configuration purposes. The on-chip interconnections of the specialized processing unit logic blocks may be configured according to a master-slave type configuration as shown in FIG. 5. In the illustrated schematic, "M" and the corresponding bold lines represent represents a master connection, "S" and the corresponding dotted lines represent a slave connection, and "Ctrl" represents control.

The interface device 520 may include one or more memory units 574 which may be controlled by a memory controller 576 provided in the logic of the specialized processing unit 560. The memory unit may support data transport between a terminal system connected through the mass storage interface 568 and a host system connected through the host hardware interface 562, in accordance with data requests issued by the terminal system. For example, the memory unit 574 may be a temporary RAM unit, such as DDR3 RAM, or another volatile memory unit configured to temporarily store data requested by read requests issued by the terminal system, in accordance with principles described herein. The memory controller 576 may be connected to the on chip bus architecture 572 to perform memory read/write operations according to signals received from other logical units of the specialized processing unit 560.

During operation, a mass storage host controller of a computing device (not pictured in FIG. 5) connected through the storage interface 560 may request the mass storage device controller 570 to perform read, write, and other operations. Upon receiving such a request, the mass storage device controller 570 may notify an interface device driver and storage process on the host system (not shown in FIG. 5) using an interrupt of the request, through the host hardware interface 562, e.g. PCI-Express. The software components on the host system may then make decisions on handling the request.

For example, in the case of a read request from the terminal system, the storage application in the host system (not pictured) may retrieve this data from some storage source and store it in the interface device memory unit 574 across the host hardware interface 562. When done, the storage application on the host system may program the mass storage device controller 570 on the specialized processing unit 560 to complete the read request by reading from the interface device memory 574. By way of example, and not by way of limitation, suppose the mass storage host controller 424 may be a SATA controller. For a SATA transaction (read/write and there are others), the mast storage host controller 424 on the streaming server 402 raises an interrupt. The mass storage host driver 426 on the streaming server 402 checks the state of the mass storage host controller 424. If the request is determined to be a 'write request', then the mass storage host controller 424 is programmed to write its data to the memory 574 (e.g., DDR3 memory) on the interface device 520. The mass storage host controller 424 may have its own built-in DMA engine 567 for this purpose. Another interrupt is raised when the data has been written to the memory 574. The mass storage host driver 426 then issues a DMA request using the DMA Engine 567 to copy from memory 574 to host system memory 440.

A buffer in the host system memory 440 may be directly shared with the storage process. When the DMA transaction to host system memory 440 is done, the storage process is notified of the write request and it will finish the write transaction. It may write data to a disk, to a network storage device or to wherever it pleases to store the data.

It is noted that a memory 574 on the interface device 520 might not be needed for the read or write operations. It is possible for the mass host storage controller 424 to directly write to host system memory 440. For example, the memory access interface unit 566 could map PCI-Express to AXI4 and also AXI4 to PCI-Express. This feature would allow any AXI4 Master device to write to host system memory.

The interface device may optionally include various other components which provide additional functionality for streaming applications run on a terminal system, such as cloud gaming streaming. For example, the specialized processing unit 560 may also include one or more audio and/or video capture blocks 578 for capturing an A/V stream from one or more terminal systems. Each of the one or more A/V capture logic units 578 may be operatively coupled to a corresponding A/V receiver 530, each of which may in turn be connected to a suitable A/V hardware interface 580, such as an HDMI port or other A/V connection port as shown in FIG. 5. A/V output from the terminal system may be connected to the A/V receiver 530 through the A/V interface 580 using a compatible A/V connector. The A/V capture unit 578 may communicate with the interface device driver and A/V process on the host system through the host hardware interface 562, which may be connected to a host system bus (e.g., a peripheral bus), and the host system may then deliver the A/V stream to a client device over a network.

The interface device 582 may also include one or more general purpose input/output (GPIO) blocks to support additional functionality. By way of example, and not by way of limitation, each of the GPIO blocks may be connected to a corresponding one of the terminal system to provide additional functionality, such as power control of the terminal systems and other functionality.

As noted above, the specialized processing unit 560 may be implemented, e.g., as an FPGA, ASIC, or other integrated circuit having blocks dedicated to certain functionality, such as a mass storage device controller, memory controller, DMA engine, and the like, in accordance with various aspects of the present disclosure. In certain implementations of the present disclosure, one or more of these units may be provided as reusable units of logic or other chip design commonly referred to in the art as IP blocks or IP cores.

Figure 6:
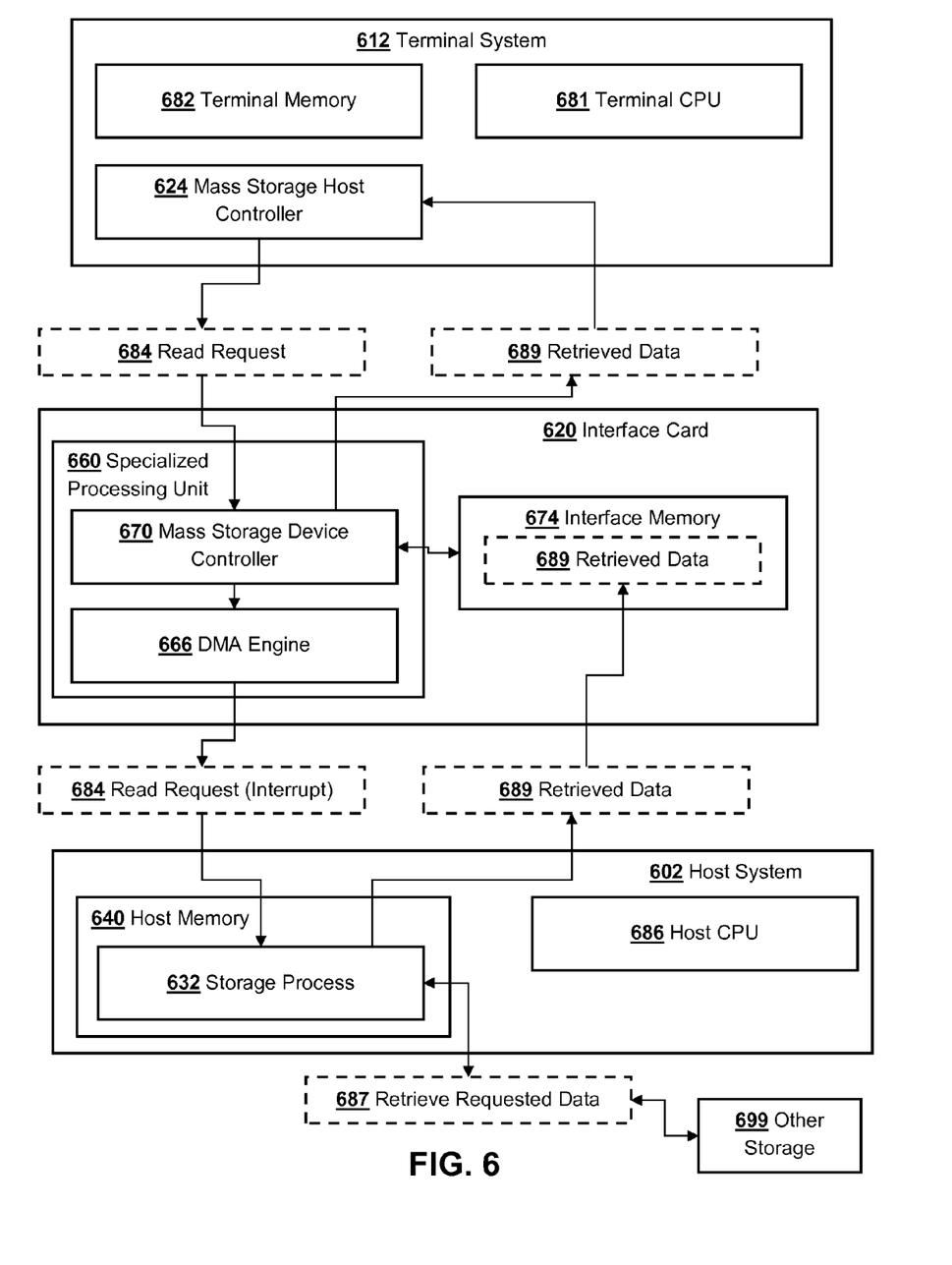
FIG. 6 is a schematic diagram of an example method of emulating a mass storage device.

FIG. 6 depicts an example flow chart for emulating a mass storage device for a terminal system 612 in accordance with various aspects of the present disclosure. In the example depicted in FIG. 6, an interface device 620 and host system 602 operatively coupled to each other are configured to emulate a mass storage device for the terminal system 612. While the illustrative example of FIG. 6 depicts emulation for a read request issued by the terminal system for purposes of explanation, it is noted that implementations of the present disclosure may be configured to complete write requests and other mass storage data requests issued by the terminal system using the illustrated components.

As shown in FIG. 6, a mass storage device may be emulated for a terminal system 612 or any other computing system, which may have a central processing unit (CPU) 681 and a memory unit 682 configured to run various applications (not pictured). The terminal system 612 may make various read, write, and other data requests through a mass storage device connector using a mass storage device controller 624. Ordinarily, these requests would be completed by a local mass storage device having a corresponding device controller. In the example of FIG. 6, these data requests may be met by an interface device 620 in communication with a host computer system 602, which may access some other storage source 699 to handle the various data requests.

In the illustration of FIG. 6, a read request 684 is issued by the mass storage host controller 624 of the terminal system 612, which is received at a mass storage device controller 670 of the specialized processing unit 660. The mass storage device controller 670 notify the storage process 632 embodied in the host system 602 using an interrupt of the request 684, e.g. via a DMA engine 666 as shown in FIG. 6. The storage process may be an application embodied in the system memory 640 of the host system 602, which may be executed by a central processing unit 686 of the host system 602 to make decisions on handling the request 684.

As shown in FIG. 6, the storage process may retrieve the requested data 687 from some other storage source 699, such as a storage server. The storage process may store the retrieved data 689 in the interface device memory unit 674, e.g., through an expansion interface (not pictured), such as PCI-e, or other communication interface with a peripheral bus of the host system 602. It is noted that, instead of being implemented as an add-on card or other peripheral component which communicates with the peripheral bus through an expansion interface, in some implementations the interface device 620 may be implemented as with the specialized processing unit 660 connected directly to the host system peripheral bus and provided as an integral part of the host system 602.

In alternative implementations, the specialized processing unit 660, e.g., FPGA, ASIC, or equivalent circuitry, could be placed directly on the motherboard of the streaming server 402 and connected to a peripheral bus on the streaming server. The specialized processing unit could be connected over PCI-Express.

Once the data retrieved by the storage process is stored in the interface memory 674, the storage process may program the mass storage device controller 670 to complete the request by accessing the stored data 689 in the interface memory and sending it to the terminal system 612.

During a read operation the mass storage device controller 670 may raise an interrupt (which could be transferred using an interrupt functionality built into the DMA engine 666) to a storage driver in the operating system of the host system 602. If the request is determined to be a read request 684, the storage driver asks the storage process 632 to 'read the data' which is stored in the host memory 640 (which may be shared with the storage driver). Once all data has been read, the DMA engine 666 may be programmed to transfer the data 689 from the host memory 640 to the interface memory 674.

CONCLUSION

It is noted that aspects of the present disclosure have been described with reference to cloud gaming as a particular example in which a need for mass storage virtualization in accordance with various implementations of the present disclosure may be desirable, but implementations of the present disclosure are not so limited. Implementations of the present disclosure may provide mass storage device for emulation for any computing device, which may not involve cloud computing or cloud gaming.

It is noted that implementations of the present disclosure may utilize any of a variety of mass storage communication protocols, including SATA, USB, IDE, RS232, Firewire, Thunderbolt, and other mass storage communication interface standards.

It is noted that implementations of the present disclosure may utilize any of a variety of audio and/or video standards, including HDMI, S-Video, component video, composite video, Display Port, VGA, DVI, and other A/V communication interface standards.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A system comprising:
    a central processing unit;
    a first memory unit operatively coupled to the central processing unit;
    a second memory unit;
    a storage process embodied in the first memory unit and executable by the central processing unit;
    a first communication interface, the first communication interface being a mass storage interface;
    a hardware interface, the hardware interface being an audio/visual (A/V) type connection port;
    a specialized processing unit operatively coupled to the first communication interface, the specialized processing unit comprising a programmable mass storage device controller portion, a memory access interface portion, a capture portion and a memory controller portion, wherein the programmable mass storage device controller portion is connected to the first communication interface and the memory access interface portion, wherein the memory controller portion of the specialized processing unit is connected to the second memory unit, wherein the capture portion is operatively coupled to a receiver, wherein the receiver is coupled to a terminal system through the hardware interface;

wherein the programmable mass storage device controller portion is configured to receive a mass storage data request through the first communication interface;

wherein the memory access interface portion is configured to notify the storage process of the mass storage data request;

wherein the storage process is configured to process the data request by accessing a storage system;

wherein the capture portion is configured to receive and audio and/or visual output from the terminal system through the receiver, wherein the capture portion communicates to an capture process running on the central processing unit and the central processing unit initiates delivery of the audio and/or visual output to a client system over a network.

2. The system of claim 1, further comprising:
wherein the data request is a read request,
wherein the storage process is configured to retrieve data corresponding to the read request from the storage system,
wherein the storage process is configured to store the retrieved data on the second memory unit,
wherein the storage process is configured to program the programmable mass storage device controller portion to complete the read request by programming the programmable mass storage device controller portion to read from the second memory unit.

3. The system of claim 1, further comprising:
a second communication interface, the second communication interface being an expansion interface,
wherein the memory access interface portion is connected to the second communication interface,
wherein the second communication interface is connected to a bus of the central processing unit.

4. The system of claim 1, further comprising:
a printed circuit board (PCB), and
a second communication interface, the second communication interface being an expansion interface,
wherein a direct memory access (DMA) engine is connected to the second communication interface,
wherein the second communication interface is connected to a bus of the central processing unit,
wherein the first communication interface, the second communication interface, and the specialized processing unit are fixed to the PCB.

5. The system of claim 1, wherein the DMA engine is directly connected to a bus of the central processing unit.

6. The system of claim 1,
wherein the memory access interface is configured to notify the storage process of the data request using an interrupt of the data request.

7. The system of claim 1, wherein the memory access interface portion includes a DMA engine configured to implement data move operations.

8. The system of claim 1,
wherein the first communication interface includes one or more mass storage ports,
wherein the specialized processing unit has a programmable mass storage device controller portion for each said mass storage port.

9. The system of claim 1,
wherein the specialized processing unit is a field programmable gate array (FPGA).

10. The system of claim 1,
wherein the specialized processing unit is an application specific integrated circuit (ASIC).

11. The system of claim 1, further comprising:
the terminal system operatively coupled to the first communication interface through a mass storage connector, the terminal system having a mass storage host controller configured to issue the mass storage data request.

12. The system of claim 1, further comprising:
a plurality of terminal systems,
wherein the specialized processing unit has a plurality of said programmable mass storage device controller portions,
wherein the first communication interface has a plurality of mass storage ports,
wherein each said terminal system is connected to a corresponding one of the mass storage ports with a mass storage connector,
wherein each said mass storage port is connected to a corresponding one of the programmable mass storage device controller portions.

* * * * *